(12) United States Patent
Shao et al.

(10) Patent No.: US 11,846,846 B1
(45) Date of Patent: Dec. 19, 2023

(54) DISPLAY PANEL

(71) Applicant: TCL China Star Optoelectronics Technology Co., Ltd., Shenzhen (CN)

(72) Inventors: Yuan Shao, Shenzhen (CN); Ji Li, Shenzhen (CN); Fang Tan, Shenzhen (CN); Jiacong Guo, Shenzhen (CN); Guang Zeng, Shenzhen (CN); Yue Wang, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/086,680

(22) Filed: Dec. 22, 2022

(30) Foreign Application Priority Data

Sep. 30, 2022 (CN) .......................... 202211208958.0

(51) Int. Cl.
  *G02F 1/1335* (2006.01)
(52) U.S. Cl.
  CPC .............................. *G02F 1/133531* (2021.01)
(58) Field of Classification Search
  CPC ............................................... G02F 1/133531
  See application file for complete search history.

(56) References Cited

U.S. PATENT DOCUMENTS

| | | | |
|---|---|---|---|
| 2007/0165165 A1* | 7/2007 | Joten ................. | G02F 1/133555 349/114 |
| 2019/0250319 A1* | 8/2019 | Kong ................. | G02B 5/3083 |
| 2020/0159066 A1* | 5/2020 | Kawahira ......... | G02F 1/133528 |

* cited by examiner

*Primary Examiner* — James A Dudek
(74) *Attorney, Agent, or Firm* — Nathan & Associates; Menachem Nathan

(57) ABSTRACT

A display panel includes a thin film transistor (TFT) array substrate, an opposite substrate, and a liquid crystal layer disposed between the TFT array substrate and the opposite substrate. The TFT array substrate includes a first substrate. The opposite substrate includes a second substrate. The display panel further includes a first viewing-angle improving layer disposed between the first substrate and the second substrate. The first viewing-angle improving layer adjoins one film layer on the first substrate or the second substrate. The first viewing-angle improving layer is disposed between the first substrate and the second substrate so that the first viewing-angle improving layer can be a stacked part manufactured integratedly with other film layers of the display panel. Thus, manufacture of the first viewing-angle improving layer can overcome a size limitation of a mold in a nanoimprinting technology, effectively improving a large-viewing-angle-display effect of a large-size display panel.

20 Claims, 4 Drawing Sheets

DISPLAY PANEL

CROSS-REFERENCE TO RELATED APPLICATION

This disclosure claims priority to a Chinese Patent Application No. 202211208958.0 filed on Sep. 30, 2022, the disclosure of which is incorporated in its entirety by reference herein.

FIELD OF DISCLOSURE

This disclosure relates to a technical field of displays, and more particularly to a display panel.

BACKGROUND OF DISCLOSURE

Liquid crystal display panel is usually composed of a liquid crystal cell composed of an array substrate, a liquid crystal layer, and an opposite substrate, and polarizers disposed on surfaces of the liquid crystal cell. A viewing-angle improving layer can be disposed on one of the polarizers to improve a problem of large-viewing-angle display.

However, the current viewing-angle improving layer is usually manufactured by nanoimprinting technology and is disposed outside the liquid crystal cell. Because of a size limitation of an imprinting mold, it is difficult to make the viewing-angle improving layer that has a large size, such as 55 inches, 65 inches, 75 inches, or beyond. Thus, a large-viewing-angle-display effect of a large-size LCD panel is unsatisfactory.

SUMMARY OF DISCLOSURE

This disclosure provides a display panel to improve a technical problem that a current large-size liquid crystal display (LCD) panel has an unsatisfactory large-viewing-angle-display effect because of a size limitation of a viewing-angle improving layer.

In order to solve the aforementioned technical problem, this disclosure provides the following technical solutions.

This disclosure provides a display panel, including:
  a thin film transistor (TFT) array substrate including a first substrate;
  an opposite substrate disposed opposite to the TFT array substrate, the opposite substrate including a second substrate;
  a liquid crystal layer disposed between the TFT array substrate and the opposite substrate; and
  at least one first viewing-angle improving layer, one of the at least one first viewing-angle improving layer adjoining a film layer in the TFT array substrate or the opposite substrate on a light exit side of the display panel.

In the display panel of this disclosure, the display panel further includes a first polarizing layer and a second polarizing layer, the first polarizing layer disposed on a surface of the first substrate close to the liquid crystal layer, and the second polarizing layer disposed on a surface of the second substrate away from the liquid crystal layer; or the first polarizing layer disposed on a surface of the second substrate close to the liquid crystal layer, and the second polarizing layer disposed on a surface of the first substrate away from the liquid crystal layer; and the first polarizing layer and the one of the at least one first viewing-angle improving layer are located on a same side of the liquid crystal layer.

In the display panel of this disclosure, the first polarizing layer is a coated polarizer.

In the display panel of this disclosure, the first polarizing layer and the one of the at least one first viewing-angle improving layer adjoin each other.

In the display panel of this disclosure, the opposite substrate is located on the light exit side of the display panel, and the one of the at least one first viewing-angle improving layer and the first polarizing layer are disposed on a side of the opposite substrate close to the liquid crystal layer.

In the display panel of this disclosure, the opposite substrate is located on the light exit side of the display panel, and the one of the at least one first viewing-angle improving layer is disposed on the surface of the second substrate close to the liquid crystal layer.

In the display panel of this disclosure, the TFT array substrate is located on the light exit side of the display panel, and the one of the at least one first viewing-angle improving layer is disposed on the surface of the first substrate close to the liquid crystal layer.

In the display panel of this disclosure, the display panel further includes a second viewing-angle improving layer; and
  the second viewing-angle improving layer and the one of the at least one first viewing-angle improving layer are located on two different sides of the liquid crystal layer.

In the display panel of this disclosure, the one of the at least one first viewing-angle improving layer includes at least a first refractive layer and a second refractive layer; and
  a refractive index of the first refractive layer is greater than a refractive index of the second refractive layer.

In the display panel of this disclosure, the first refractive layer is disposed close to the light exit side of the display panel, and the second refractive layer is located on a side of the first refractive layer away from the light exit side of the display panel.

In the display panel of this disclosure, the second refractive layer includes a plurality of separately disposed refractive parts, the refractive parts embedded in the first refractive layer;
  sizes of cross sections that are of each of the refractive parts and are perpendicular to a light exit direction of the display panel gradually decrease along the light exit direction.

Advantageous effects are as follows. In this disclosure, a first viewing-angle improving layer is disposed between the first substrate and the second substrate in the display panel so that the first viewing-angle improving layer can be a stacked part manufactured integratedly with other film layers of the display panel. That is, the first viewing-angle improving layer can be manufactured by a method similar to that of other film layers on the first substrate or the second substrate such as whole surface coating, or deposition-of-film-layer-on-whole-surface. Thus, manufacture of the viewing-angle improving layer can overcome the size limitation of the mold in the nanoimprinting technology, effectively improving the large-viewing-angle-display effect of the large-size display panel.

DESCRIPTION OF REFERENCE NUMERALS IN DRAWINGS

Figure 1:
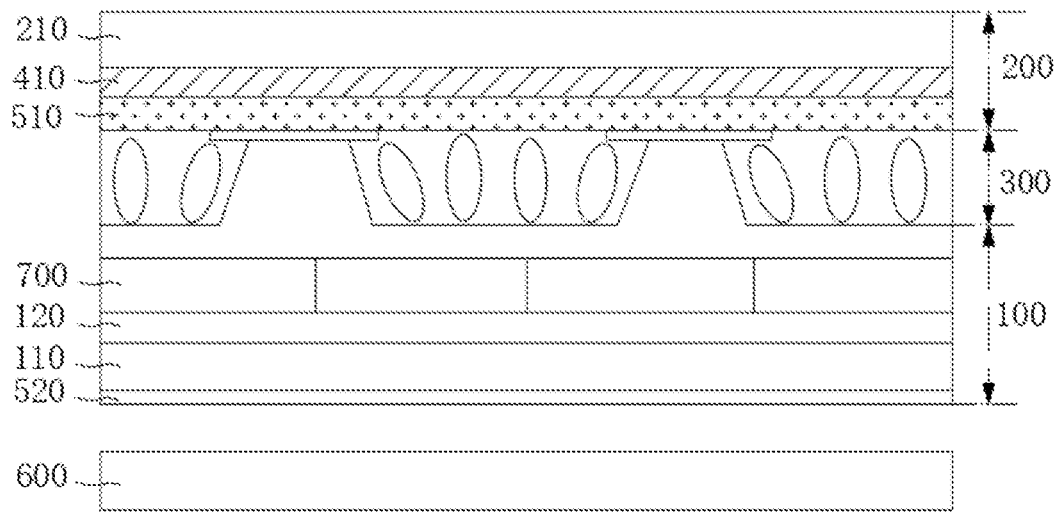
FIG. 1 is a schematic diagram of a first structure of the display panel according to this disclosure.

100: thin film transistor (TFT) array substrate; 110: first substrate; 120: array driving layer;
200: opposite substrate; 210: second substrate
300: liquid crystal layer;
410: first viewing-angle improving layer; 411: first refractive layer; 412: second refractive layer; 4121: refractive parts; 4122: refractive bottom layer; 420: second viewing-angle improving layer;
510: first polarizing layer; 520: second polarizing layer;
600: backlight source;
700: color filter layer.

DETAILED DESCRIPTION OF EMBODIMENTS

Technical solutions in the embodiments of this disclosure will be described clearly and completely hereinafter with reference to the accompanying drawings in the embodiments of this disclosure. Apparently, the described embodiments are merely some rather than all embodiments of this disclosure. All other embodiments obtained by persons skilled in the art on the basis of the embodiments of this disclosure without creative efforts shall fall within the protection scope of this disclosure. In addition, it should be understood that the specific embodiments described herein are only used to illustrate and explain the this disclosure but not used to limit the this disclosure. In the this disclosure, unless otherwise stated, the directional terms such as "up" and "down" used herein generally refer to an up direction and a down direction of device in actual use or working state, specifically the drawing directions of the drawings, and "inside" and "outside" are with respect to a contour of the device.

Liquid crystal displays (LCDs) have been widely used because LCDs have many advantages such as thin bodies, power saving, and no radiation. LCDs can be roughly divided into a twisted nematic type, an in-plane switching (IPS) type, and a vertical alignment (VA) type according to different methods for driving liquid crystals. Compared with other types of LCDs, VA type LCDs have extremely high contrast and have extremely wide applications in large-size displays such as televisions (TVs).

A VA type LCD panel is usually composed of a liquid crystal cell composed of an array substrate, a liquid crystal layer, and a color filter substrate, and linear polarizers disposed on two side surfaces of the liquid crystal cell. Because of poor viewing-angle performance of the VA type LCD, in a current method, a viewing-angle improving layer is added on one of the polarizers to achieve the purpose of viewing-angle improvement. However, the current viewing-angle improving layer is usually manufactured by nanoimprinting technology. Because of a size limitation of an imprinting mold, it is difficult to make the viewing-angle improving layer that has a large size, such as 55 inches, 65 inches, 75 inches, or beyond. Thus, a large-viewing-angle-display effect of a large-size LCD panel is unsatisfactory. On the basis of the aforementioned technical problem, this disclosure provides the following solutions.

Referring FIGS. 1 to 8, this disclosure provides a display panel including a thin film transistor (TFT) array substrate 100, an opposite substrate 200, and a liquid crystal layer 300 disposed between the TFT array substrate 100 and the opposite substrate 200. The TFT array substrate 100 includes a first substrate 110. The opposite substrate 200 includes a second substrate 210. The display panel further includes a first viewing-angle improving layer 410. The first viewing-angle improving layer 410 adjoins a film layer in the TFT array substrate 100 or the opposite substrate 200 on a light exit side of the display panel.

In this disclosure, a first viewing-angle improving layer 410 is disposed in the display panel and can be a stacked part manufactured integratedly with other film layers of the display panel. That is, the first viewing-angle improving layer 410 can be manufactured by a method similar to that of other film layers on the first substrate 110 or the second substrate 210 such as whole surface coating, or deposition-of-film-layer-on-whole-surface. Thus, manufacture of the viewing-angle improving layer can overcome the size limitation of the mold in the nanoimprinting technology, effectively improving the large-viewing-angle-display effect of the large-size display panel, such as increasing large-viewing-angle display luminance and contrast, and reducing color-shift.

The technical solutions of this disclosure will now be described in conjunction with specific embodiments. It should be noted that a description order of the following embodiments is not intended to limit a preference order of the embodiments.

In the present embodiments, material of the first substrate 110 and the second substrate 210 can be at least one of the following materials: a transparent glass material, a polyimide material, a polyester material, and the like.

In the present embodiments, the first viewing-angle improving layer 410 can be formed on the first substrate 110 or the second substrate 210 by the method such as whole surface coating or the deposition-on-whole-surface so that the first viewing-angle improving layer 410 can form an integrated stack structure with other film layers on the first substrate 110 or the second substrate 210. Thus, not only is the large-viewing-angle-display effect of the display panel improved, but manufacturing cost of the viewing-angle improving layer is also reduced.

In the present embodiments, material of the viewing-angle improving layer can be a resin material with a refractive index ranging from 1.3 to 1.8.

Referring to FIG. 1, in the display panel of this disclosure, there is one of the first viewing-angle improving layer 410, and when the TFT array substrate 100 is located on the light exit side of the display panel, the first viewing-angle improving layer 410 can adjoin the film layer in the TFT array substrate 100; when the opposite substrate 200 is located on the light exit side of the display panel, the first viewing-angle improving layer 410 can adjoin the film layer in the opposite substrate 200.

In the present embodiments, there can be two, three, four, etc., of the first viewing-angle improving layers 410. In this case, the plurality of the first viewing-angle improving layers 410 can be disposed in the film layers of the TFT array substrate 100 and the film layers of the opposite substrate 200, respectively. In the present embodiments, the number of the first viewing-angle improving layers 410 can be adjusted according to a viewing-angle-improvement effect of the first viewing-angle improving layers 410, so that the display panel achieves the best large-viewing-angle-display effect.

In the present embodiments, by disposing the at least one first viewing-angle improving layer 410 on the light exit side of the display panel, light exiting of the display panel can be adjusted through the at least one first viewing-angle improving layer 410 to achieve a better display effect.

Referring to FIGS. 1 to 4, in the display panel of this disclosure, the display panel can further include a first polarizing layer 510 and a second polarizing layer 520. The first polarizing layer 510 and the first viewing-angle improving layer 410 are located on a same side of the liquid crystal layer 300. In other words, the first polarizing layer 510 and the first viewing-angle improving layer 410 can be both disposed on the first substrate 110, or the first polarizing layer 510 and the first viewing-angle improving layer 410 can be both disposed on the second substrate 210.

In the present embodiments, the first polarizing layer 510 and the second polarizing layer 520 are located on two different sides of the liquid crystal layer 300. In other words, the first polarizing layer 510 and the second polarizing layer 520 are each disposed on respective one of two substrates which are the first substrate 110 and the second substrate 210.

In the present embodiments, by disposing polarizing structures in both the TFT array substrate 100 and the opposite substrate 200, the display panel can have a good polarizing effect on backlight, achieving normal display of the display panel.

In the present embodiments, the first polarizing layer 510 can be a coated polarizer. That is, the first polarizing layer 510 can be formed on one side of the first viewing-angle improving layer 410 by a method such as whole surface coating or deposition-on-whole-surface so that the first polarizing layer 510 not only polarizes light, but also serves as a stacked structure inside the display panel which improves viewing-angle display effect. The first polarizing layer 510 cooperates with the first viewing-angle improving layer 410 to further improve the large-viewing-angle-display effect.

In the present embodiments, material of the first polarizing layer 510 can be an iodine-containing dye with a polarizing effect, and the first polarizing layer 510 can be formed by a method similar to that of the first viewing-angle improving layer 410 such as whole surface coating, or the deposition-on-whole-surface, effectively reducing manufacturing cost of the polarizing structure. Or the first polarizing layer 510 can be a nanoimprinted grating.

Figure 2:
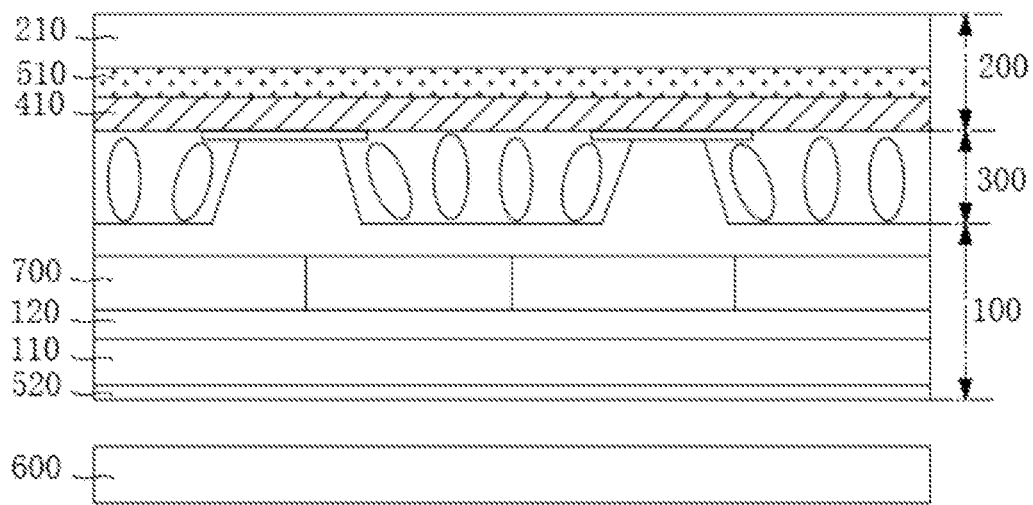
FIG. 2 is a schematic diagram of a second structure of the display panel according to this disclosure.

Referring to FIGS. 1 and 2, in the display panel of this disclosure, when the opposite substrate 200 is located on the light exit side of the display panel, the first polarizing layer 510 can be disposed on a side of the second substrate 210 close to the liquid crystal layer 300, and the second polarizing layer 520 can be disposed on a surface of the first substrate 110 away from the liquid crystal layer 300. In this case, the first viewing-angle improving layer 410 adjoins a surface of the second substrate 210 close to the liquid crystal layer 300, the first polarizing layer 510 is located on a side of the first viewing-angle improving layer 410 away from the second substrate 210, and the first polarizing layer 510 adjoins the first viewing-angle improving layer 410; or in this case, the first polarizing layer 510 adjoins a surface of the second substrate 210 close to the liquid crystal layer 300, the first viewing-angle improving layer 410 is located on a side of the first polarizing layer 510 away from the second substrate 210, and the first viewing-angle improving layer 410 adjoins the first polarizing layer 510.

It should be noted that in the present embodiments, whether the first viewing-angle improving layer 410 or the first polarizing layer 510 is closer to the second substrate 210, a stack structure including the first viewing-angle improving layer 410 and the first polarizing layer 510 in the present embodiments improves the large-viewing-angle-display effect well.

Figure 3:
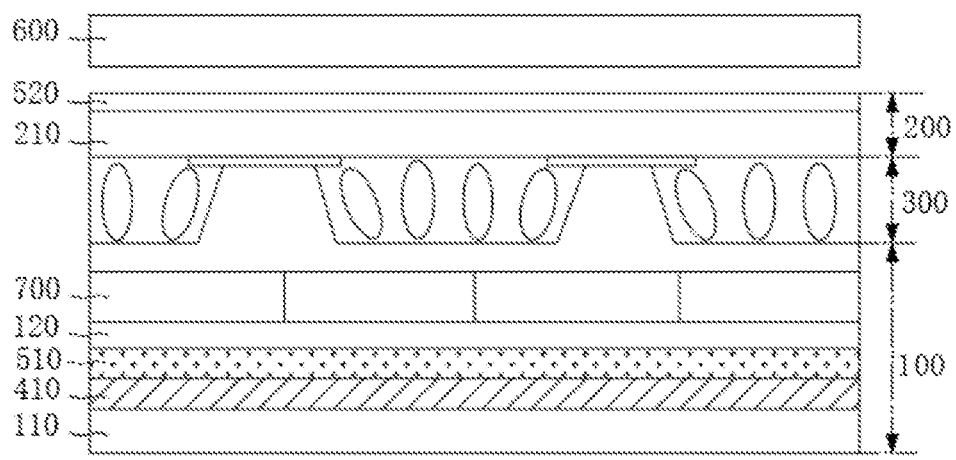
FIG. 3 is a schematic diagram of a third structure of the display panel according to this disclosure.
Figure 4:
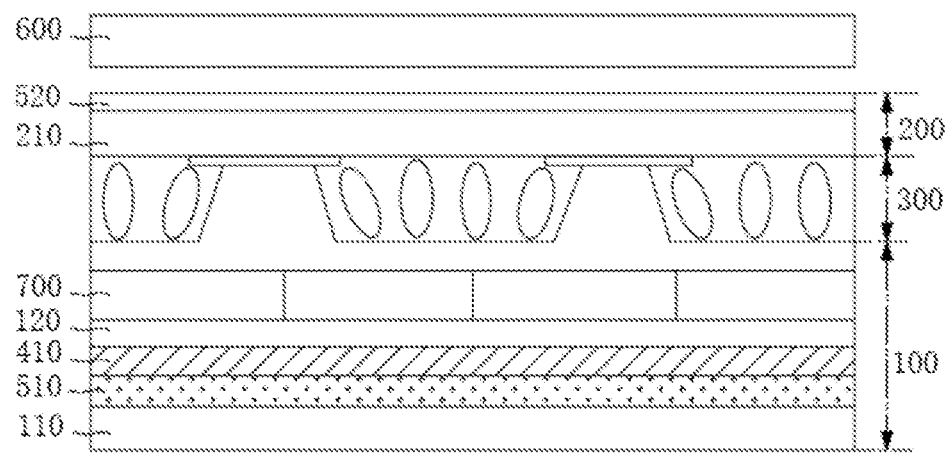
FIG. 4 is a schematic diagram of a fourth structure of the display panel according to this disclosure.

Referring to FIGS. 3 and 4, in the present embodiments, when the TFT array substrate 100 is located on the light exit side of the display panel, the first polarizing layer 510 can be disposed on a side of the first substrate 110 close to the liquid crystal layer 300, and the second polarizing layer 520 can be disposed on a surface of the second substrate 210 away from the liquid crystal layer 300. In this case, the first viewing-angle improving layer 410 adjoins a surface of the first substrate 110 close to the liquid crystal layer 300, the first polarizing layer 510 is located on a side of the first viewing-angle improving layer 410 away from the first substrate 110, and the first polarizing layer 510 adjoins the first viewing-angle improving layer 410, as illustrated in FIG. 3; or in this case, the first polarizing layer 510 adjoins a surface of the first substrate 110 close to the liquid crystal layer 300, the first viewing-angle improving layer 410 is located on a side of the first polarizing layer 510 away from the first substrate 110, and the first viewing-angle improving layer 410 adjoins the first polarizing layer 510, as illustrated in FIG. 4.

It should be noted that in the present embodiments, whether the first viewing-angle improving layer 410 or the first polarizing layer 510 is closer to the first substrate 110, a stack structure including the first viewing-angle improving layer 410 and the first polarizing layer 510 in the present embodiments improves the large-viewing-angle-display effect well. Because the first polarizing layer 510 and the first viewing-angle improving layer 410 adjoin each other, there is no other film layer structure between the first polarizing layer 510 and the first viewing-angle improving layer 410. Thus, light propagation is less adversely impacted by a film layer structure between the two.

Referring to FIGS. 1 to 6, in the display panel of this disclosure, the display panel can further include an array driving layer 120 and a color filter layer 700. The array driving layer 120 can be disposed on the first substrate 110. The color filter layer 700 can be disposed on one of the first substrate 110 or the second substrate 210.

In the present embodiments, the array driving layer 120 and the color filter layer 700 can be both disposed on the first substrate 110, and the color filter layer 700 is located on a side of the array driving layer 120 close to the liquid crystal layer 300.

Referring to FIGS. 1 and 2, when the opposite substrate 200 is located on the light exit side of the display panel, i.e., when the opposite substrate 200 is disposed away from a backlight source 600 and the TFT array substrate 100 is disposed close to the backlight source 600, the first viewing-angle improving layer 410 and the first polarizing layer 510 are both disposed on the second substrate 210, the array driving layer 120 is disposed on a surface of the first substrate 110 close to the liquid crystal layer 300, and the color filter layer 700 is disposed on a surface of the array driving layer 120 away from the first substrate 110.

Referring to FIGS. 3 and 4, when the TFT array substrate 100 is located on the light exit side of the display panel, i.e., when the TFT array substrate 100 is disposed away from a backlight source 600 and the opposite substrate 200 is disposed close to the backlight source 600, the first viewing-angle improving layer 410 and the first polarizing layer 510 are both disposed on the first substrate 110. In this case, the array driving layer 120 and the color filter layer 700 are both located on a side of two layers away from the first substrate 110, wherein the two layers are the first viewing-angle improving layer 410 and the first polarizing layer 510. In the TFT array substrate 100, the first substrate 110, the first viewing-angle improving layer 410, the first polarizing layer 510, the array driving layer 120, and the color filter layer 700 are stacked sequentially, or in the TFT array substrate 100, the first substrate 110, the first polarizing layer 510, the first viewing-angle improving layer 410, the array driving layer 120, and the color filter layer 700 are stacked sequentially.

Figure 5:
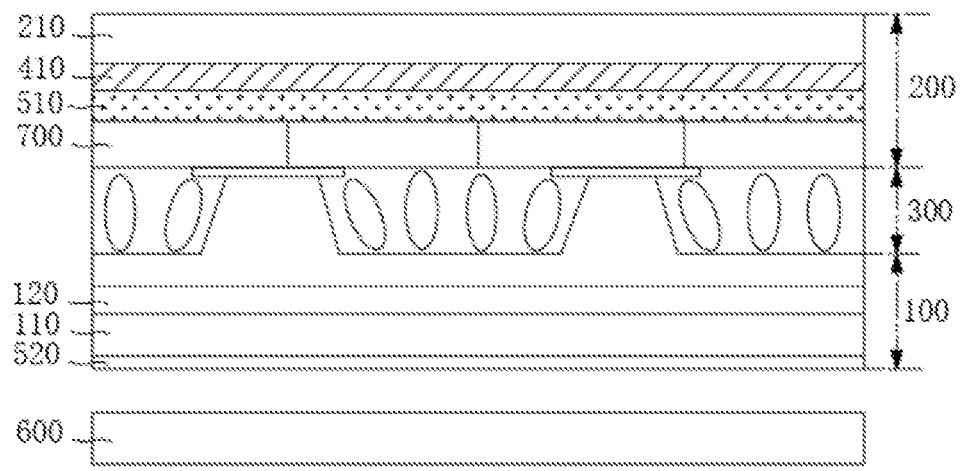
FIG. 5 is a schematic diagram of a fifth structure of the display panel according to this disclosure.
Figure 6:
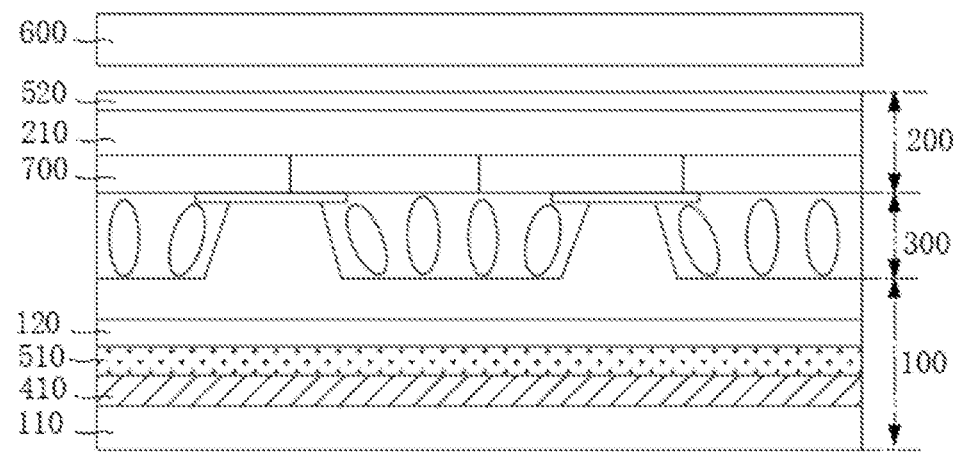
FIG. 6 is a schematic diagram of a sixth structure of the display panel according to this disclosure.

Referring to FIGS. 5 and 6, in the present embodiments, the color filter layer 700 can alternatively be disposed on the second substrate 210, and the color filter layer 700 is located on a side of the second substrate 210 close to the liquid crystal layer 300. In this case, if the first viewing-angle improving layer 410 and the first polarizing layer 510 are disposed on the second substrate 210, the color filter layer 700 is located on a side of the two layers close to the liquid crystal layer 300, as illustrated in FIG. 5, wherein the two layers are the first viewing-angle improving layer 410 and the first polarizing layer 510. If the first viewing-angle improving layer 410 and the first polarizing layer 510 are disposed on the first substrate 110, the color filter layer 700 is located on a side of the second substrate 210 close to the liquid crystal layer 300, as illustrated in FIG. 6.

In the present embodiments, the color filter layer 700 can include color resists of at least three types of colors such as a red color resist (R), a green color resist (G), and a blue color resist (B).

In the present embodiments, the array driving layer 120 can include a plurality of data lines and a plurality of scan lines (not illustrated in the figures) arranged to cross each other. The data lines and the scan lines can divide the display panel into a plurality of sub-pixel units arranged in an array. Each of the sub-pixel units can include a pixel electrode layer (not illustrated in the figures), a common electrode layer, and at least one TFT. A gate of one of the at least one TFT can be electrically connected to one of the scan lines, a source of the one of the at least one TFT can be electrically connected to one of the data lines, and a drain of the one of the at least one TFT can be electrically connected to the pixel electrode layer.

In the present embodiments, the display panel can further include the common electrode layer (not illustrated in the figures) located in the opposite substrate 200. The common electrode layer is electrically connected to a common voltage terminal. Liquid crystal molecules in the liquid crystal layer 300 are deflected under a driving voltage between the pixel electrode and the common electrode layer to achieve display control of each different sub-pixel unit.

Figure 7:
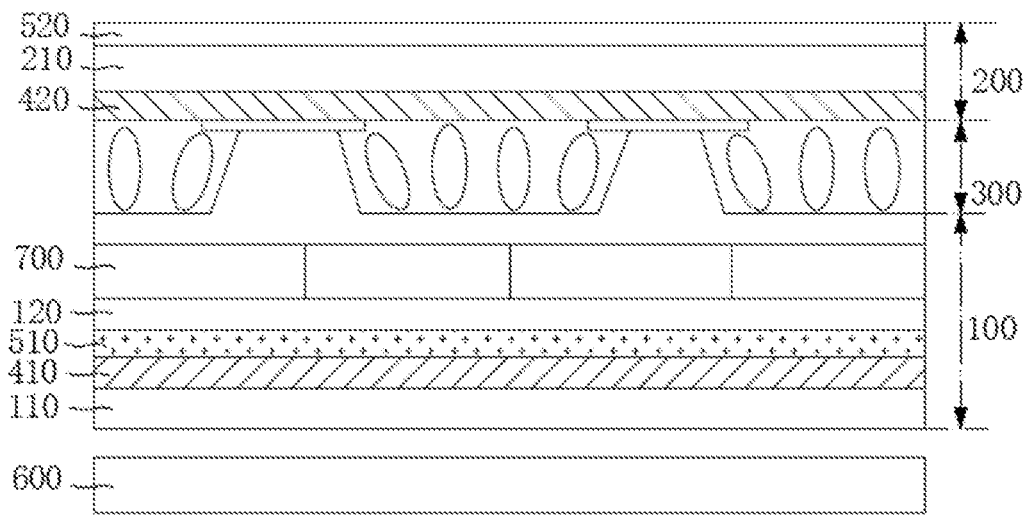
FIG. 7 is a schematic diagram of a seventh structure of the display panel according to this disclosure.

Referring to FIG. 7, in the display panel of this disclosure, the display panel can further include at least one second viewing-angle improving layer 420. One of the at least one second viewing-angle improving layer 420 and the first viewing-angle improving layer 410 can be located on two different sides of the liquid crystal layer 300.

In the present embodiments, "one of the at least one second viewing-angle improving layer 420 and the first viewing-angle improving layer 410 being located on two different sides of the liquid crystal layer 300" can be understood to refer to the first viewing-angle improving layer 410 and the one of the at least one second viewing-angle improving layer 420 being not both disposed on a same substrate. For example, if the first viewing-angle improving layer 410 is disposed on the first substrate 110 and adjoins a film layer on first substrate 110, the one of the at least one second viewing-angle improving layer 420 is disposed on the second substrate 210 and adjoins a film layer on the second substrate 210. In this case, the first viewing-angle improving layer 410 and the one of the at least one second viewing-angle improving layer 420 can perform viewing-angle improvement on both light entering and exiting the liquid crystal layer 300. For example, the first viewing-angle improving layer 410 is disposed on a light entry side of the liquid crystal layer 300, and the one of the at least one second viewing-angle improving layer 420 is disposed on a light exit side of the liquid crystal layer 300. In this case, backlight emitted by the backlight source 600 can be converged by the first viewing-angle improving layer 410 to enter the liquid crystal layer 300, reducing backlight loss, improving overall display luminance, and improving contrast. The one of the at least one second viewing-angle improving layer 420 can diverge light incident into the liquid crystal layer 300, so that large-angle emitted light is more, and large-viewing-angle display luminance is further enhanced.

In the present embodiments, material and a manufacturing method of the one of the at least one second viewing-angle improving layer 420 can be same as the first viewing-angle improving layer 410. That is, by a method such as whole surface coating, or deposition-on-whole-surface, the one of the at least one second viewing-angle improving layer 420 can adjoin a film layer in the TFT array substrate 100 or the opposite substrate 200 to form an integrated stack structure, and to cooperate with the first viewing-angle improving layer 410 to further improve the large-viewing-angle-display effect.

Figure 8:
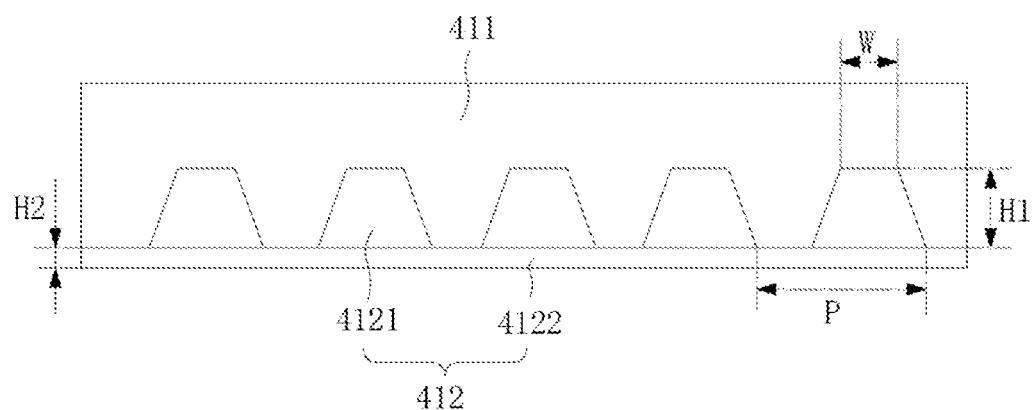
FIG. 8 is a schematic diagram of a structure of the first viewing-angle improving layer according to this disclosure.

Referring to FIG. 8, in the display panel of this disclosure, the first viewing-angle improving layer 410 and the one of the at least one second viewing-angle improving layer 420 can include at least a first refractive layer 411 and a second refractive layer 412. A refractive index of the first refractive layer 411 can be greater than that of the second refractive layer 412. Specifically, the refractive index of the first refractive layer 411 can range from 1.5 to 1.8. The refractive index of the second refractive layer 412 can range from 1.3 to 1.6.

In the present embodiments, material of the first refractive layer 411 and material of the second refractive layer 412 can be resin materials with different refractive indices.

In the present embodiments, a difference in the refractive index between the first viewing-angle improving layer 410 and the one of the at least one first viewing-angle improving layer can range from 0.14 to 0.16, so that the difference in the refractive index between the first viewing-angle improving layer 410 and the one of the at least one first viewing-angle improving layer is within a difference range with better overall refractive effect. Thus, an overall large-viewing-angle-improvement effect of the first viewing-angle improving layer 410 is better improved.

In the present embodiments, the first viewing-angle improving layer 410 is disposed to include at least two refractive layers with different refractive indices, so that when light passes through the first viewing-angle improving layer 410, the light can be refracted twice by the first refractive layer 411 and the second refractive layer 412.

Thus, backlight light can be emitted from the display panel more efficiently, and large-viewing-angle display luminance and contrast can be further improved.

Referring to FIG. 8, in the display panel of this disclosure, the first refractive layer 411 can be disposed close to the light exit side of the display panel, and the second refractive layer 412 can be located on a side of the first refractive layer 411 away from the light exit side of the display panel. In this case, the backlight light is firstly refracted by the second refractive layer 412 with the lesser refractive index to exit at a greater angle, and then refracted by the first refractive layer 411 with the greater refractive index to exit at a further greater angle. Thus, the angle at which the backlight exits is increased twice, effectively improving large-viewing-angle display luminance.

In the present embodiments, the second refractive layer 412 can include a plurality of separately disposed refractive parts 4121. The refractive parts 4121 are embedded in the first refractive layer 411. In this case, the refractive parts 4121 and the first refractive layer 411 form a toothed engagement structure at where the refractive parts 4121 and the first refractive layer 411 join each other. The first refractive layer 411 and the second refractive layer 412 are more firmly formed into a whole by the toothed engagement structure.

In the present embodiments, sizes of cross sections that are of each of the refractive parts 4121 and are perpendicular to a first direction can gradually decrease along the first direction. The first direction is a light exit direction of the display panel. Specifically, a shape of each of the refractive parts 4121 can be a pyramidal frustum structure having upper and lower bases with different widths. The pyramidal frustum structures can be in a form of point structures and distributed in an array across a whole surface. Or the pyramidal frustum structures can be in a form of elongated structures and arranged at equal intervals along a certain direction.

In the present embodiments, the second refractive layer 412 can further include a refractive bottom layer 4122 disposed on a whole surface. The refractive parts 4121 can be evenly distributed on the second refractive layer 412. The refractive bottom layer 4122 and the refractive parts 4121 can be integrally formed.

In the present embodiments, an angle between a side surface of each of the refractive parts 4121 and a surface of the refractive bottom layer 4122 can range from 30° to 100°.

In the present embodiments, in a direction in which the refractive parts 4121 are arranged, a width W of an end surface of each of the refractive parts 4121 close to the first refractive layer 411 can range from 2 μm to 20 μm. A respective sum P of a width of an end surface of each of the refractive parts 4121 close to the refractive bottom layer 4122 and spacing between each of the refractive parts 4121 and a respective refractive part 4121 adjacent to each of the refractive parts 4121 can range from 5 μm to 50 μm.

In the present embodiments, in the light exit direction of the display panel, a height H1 of each of the refractive parts 4121 can range from 5 μm to 30 μm. A height H2 of the refractive bottom layer 4122 can range from 0.1 μm to 10 μm.

In the present embodiments, through the above disposition, the first viewing-angle improving layer 410 can have a better viewing-angle-adjustment effect on light, further improving a large-viewing-angle-display effect of the display panel.

In this disclosure, a first viewing-angle improving layer 410 is disposed between the first substrate 110 and the second substrate 210 in the display panel so that the first viewing-angle improving layer 410 can be a stacked part manufactured integratedly with other film layers of the display panel. That is, the first viewing-angle improving layer 410 can be manufactured by a method similar to that of other film layers on the first substrate 110 or the second substrate 210 such as whole surface coating, or deposition-of-film-layer-on-whole-surface. Thus, manufacture of the viewing-angle improving layer can overcome the size limitation of the mold in the nanoimprinting technology, effectively improving the large-viewing-angle-display effect of the large-size display panel.

The display panels provided by the embodiments of this disclosure have been described in detail above. The principles and implementation manners of this disclosure are described herein using specific examples. The description of the foregoing embodiments is only for facilitating understanding the methods of this disclosure and the core ideas thereof. Also, for persons skilled in the art, changes in specific embodiments and application scope can be made on the basis of the idea of this disclosure. In summary, content of the present specification should not be construed as limitations to this disclosure.

What is claimed is:

1. A display panel, comprising:
   a thin film transistor (TFT) array substrate comprising a first substrate;
   an opposite substrate disposed opposite to the TFT array substrate, the opposite substrate comprising a second substrate;
   a liquid crystal layer disposed between the TFT array substrate and the opposite substrate; and
   at least one first viewing-angle improving layer, one of the at least one first viewing-angle improving layer adjoining a film layer in the TFT array substrate or the opposite substrate on a light exit side of the display panel;
   wherein the one of the at least one first viewing-angle improving layer comprises at least a first refractive layer and a second refractive layer, the first refractive layer is disposed close to the light exit side of the display panel, and the second refractive layer is located on a side of the first refractive layer away from the light exit side of the display panel; and
   the second refractive layer comprises a plurality of separately disposed refractive parts, and the refractive parts are embedded in the first refractive layer.

2. The display panel of claim 1, wherein the display panel further comprises a first polarizing layer and a second polarizing layer, the first polarizing layer disposed on a surface of the first substrate close to the liquid crystal layer, and the second polarizing layer disposed on a surface of the second substrate away from the liquid crystal layer; or the first polarizing layer disposed on a surface of the second substrate close to the liquid crystal layer, and the second polarizing layer disposed on a surface of the first substrate away from the liquid crystal layer; and
   wherein the first polarizing layer and the one of the at least one first viewing-angle improving layer are located on a same side of the liquid crystal layer.

3. The display panel of claim 2, wherein the first polarizing layer is a coated polarizer.

4. The display panel of claim 2, wherein the first polarizing layer and the one of the at least one first viewing-angle improving layer adjoin each other.

5. The display panel of claim 4, wherein the opposite substrate is located on the light exit side of the display panel, and the one of the at least one first viewing-angle improving layer and the first polarizing layer are disposed on a side of the opposite substrate close to the liquid crystal layer.

6. The display panel of claim 4, wherein the opposite substrate is located on the light exit side of the display panel, and the one of the at least one first viewing-angle improving layer is disposed on the surface of the second substrate close to the liquid crystal layer.

7. The display panel of claim 4, wherein the TFT array substrate is located on the light exit side of the display panel, and the one of the at least one first viewing-angle improving layer is disposed on the surface of the first substrate close to the liquid crystal layer.

8. The display panel of claim 2, wherein the display panel further comprises a second viewing-angle improving layer; and
wherein the second viewing-angle improving layer and the one of the at least one first viewing-angle improving layer are located on two different sides of the liquid crystal layer.

9. The display panel of claim 1, wherein a refractive index of the first refractive layer is greater than a refractive index of the second refractive layer.

10. The display panel of claim 9, wherein sizes of cross sections that are of each of the refractive parts and are perpendicular to a light exit direction of the display panel gradually decrease along the light exit direction.

11. The display panel of claim 2, wherein a refractive index of the first refractive layer is greater than a refractive index of the second refractive layer.

12. The display panel of claim 11, wherein sizes of cross sections that are of each of the refractive parts and are perpendicular to a light exit direction of the display panel gradually decrease along the light exit direction.

13. The display panel of claim 3, wherein a refractive index of the first refractive layer is greater than a refractive index of the second refractive layer.

14. The display panel of claim 13, wherein sizes of cross sections that are of each of the refractive parts and are perpendicular to a light exit direction of the display panel gradually decrease along the light exit direction.

15. The display panel of claim 4, wherein a refractive index of the first refractive layer is greater than a refractive index of the second refractive layer.

16. The display panel of claim 15, wherein sizes of cross sections that are of each of the refractive parts and are perpendicular to a light exit direction of the display panel gradually decrease along the light exit direction.

17. The display panel of claim 1, wherein the refractive parts and the first refractive layer form a toothed engagement structure where the refractive parts and the first refractive layer join each other.

18. The display panel of claim 1, wherein the second refractive layer further comprises a refractive bottom layer disposed on a whole surface, and the refractive parts are evenly distributed on the second refractive layer.

19. The display panel of claim 1, wherein an angle between a side surface of each of the refractive parts and a surface of the refractive bottom layer ranges from 30° to 100°.

20. The display panel of claim 1, wherein a shape of each of the refractive parts is a pyramidal frustum structure having upper and lower bases with different widths.

* * * * *